United States Patent [19]
Lee

[11] Patent Number: 6,025,553
[45] Date of Patent: Feb. 15, 2000

[54] PORTABLE MUSIC PERFORMANCE DEVICE

[75] Inventor: Sea Yong Lee, Suwon, Rep. of Korea

[73] Assignee: Capital Bridge Co. Ltd., Seoul, Rep. of Korea

[21] Appl. No.: 08/872,666

[22] Filed: Jun. 10, 1997

Related U.S. Application Data

[63] Continuation of application No. 08/382,060, filed as application No. PCT/KR94/00050, May 19, 1994, abandoned.

[51] Int. Cl.[7] .................................................. G10H 1/36
[52] U.S. Cl. .............................. 84/610; 84/602; 84/604; 84/634; 84/645
[58] Field of Search .............................. 84/601, 602, 609, 84/610, 621–622, 625, 634, 645, 603–606

[56] References Cited

U.S. PATENT DOCUMENTS

| | | |
|---|---|---|
| 3,934,201 | 1/1976 | Majefski . |
| 4,797,750 | 1/1989 | Karweit . |
| 5,131,311 | 7/1992 | Murakami et al. ........................ 84/609 |
| 5,194,682 | 3/1993 | Okamura et al. ........................ 84/625 |
| 5,218,580 | 6/1993 | Okamura et al. ........................... 369/2 |
| 5,243,582 | 9/1993 | Yamauchi . |
| 5,245,600 | 9/1993 | Yamauchi et al. ........................ 369/49 |
| 5,287,789 | 2/1994 | Zimmerman .......................... 84/477 R |
| 5,296,643 | 3/1994 | Kuo . |
| 5,323,257 | 6/1994 | Abe et al. ................................ 359/159 |
| 5,349,480 | 9/1994 | Takao ..................................... 360/74.1 |
| 5,408,686 | 4/1995 | Mankovitz ................................ 455/66 |
| 5,566,290 | 10/1996 | Silverbrook ............................. 395/152 |
| 5,606,143 | 2/1997 | Young ...................................... 84/600 |

FOREIGN PATENT DOCUMENTS

| | | |
|---|---|---|
| 0527591 | 2/1993 | European Pat. Off. . |
| 0675666A1 | 4/1995 | European Pat. Off. . |

OTHER PUBLICATIONS

TTL Logic Standard TTL, Schottky, Low–Power Schottky, Data Book, Texas Instruments Incorporated Copyright 1985 Revised Mar. 1988.

SN54LS138, SN54S138, SN74LA138, SN74S138A 3 line to 8 line Decorders/demultiplexers, pp. 2–426 to 2–434; SN54LS373, SN54LS374, SN54S373, SN54S374, SN74LS374, SN74S373, SN74S374 Octal D–type Transparent Latches and Edge–triggered Flip–flops pp. 2–883 to 2–890.

Samsung Data Book Samsung MOS Memory, pp. 262–265 KM23C4001H(G) CMOS MASK ROM pp. 353–356 KM23C16000(G) CMOS MASK ROM.

Samsung Electronics 1993/94.

Zilog, Z86E21 CMOS Z8V® OTP Microcontroller—Product Specification 1991 by Zilog, Inc. pp. 289–332.

LSI Condensed Catalog Oct. 1993 Yamaha LSI YM 3812—FM Operator Type–L II (OPL II) Nippon Gakki Co., Ltd. Cat. No. LSI–2138120.

Yamaha LSI YM3014—Serial Input Floating D/A Converter (DAC–SS) Nippon Gakki Co., Ltd. Cat No. LSI–2130140.

Itri Erso ES 56028 Echo Sound Processor—data book Y.C. Corporation.

'94 Discrete Semiconductor Data Book, Korea Electronics Co., Ltd. Sep. 1993 Semiconductor Technical Data—KTC3880 Epitaxial Planar NPN Transistor pp. 370–372.

Samsung Data Book MOS Memory, pp. 55–64 KM6264BL/ KM6264BL–L CMOS SRAM Samsung Electronics 1993/94.

Samsung Data Book Samsung Linear IC, pp. 84 & 85 KA78XX/A/I Linear Integrated Circuit; pp. 293–301 LM224/A, LM324/A, LM2902 Linear Integrated Circuit Samsung Electronics vol. 4, 1992.

Primary Examiner—William M. Shoop, Jr.
Assistant Examiner—Marlon T. Fletcher
Attorney, Agent, or Firm—Londa and Traub LLP

[57] ABSTRACT

A portable music performance device combines an external audio input, such as a singer's voice singing the lyrics of a song into a microphone, and stored musical accompaniment data for the song, preferably data stored in a ROM package, and produces an RF signal for transmission to a receiver.

40 Claims, 12 Drawing Sheets

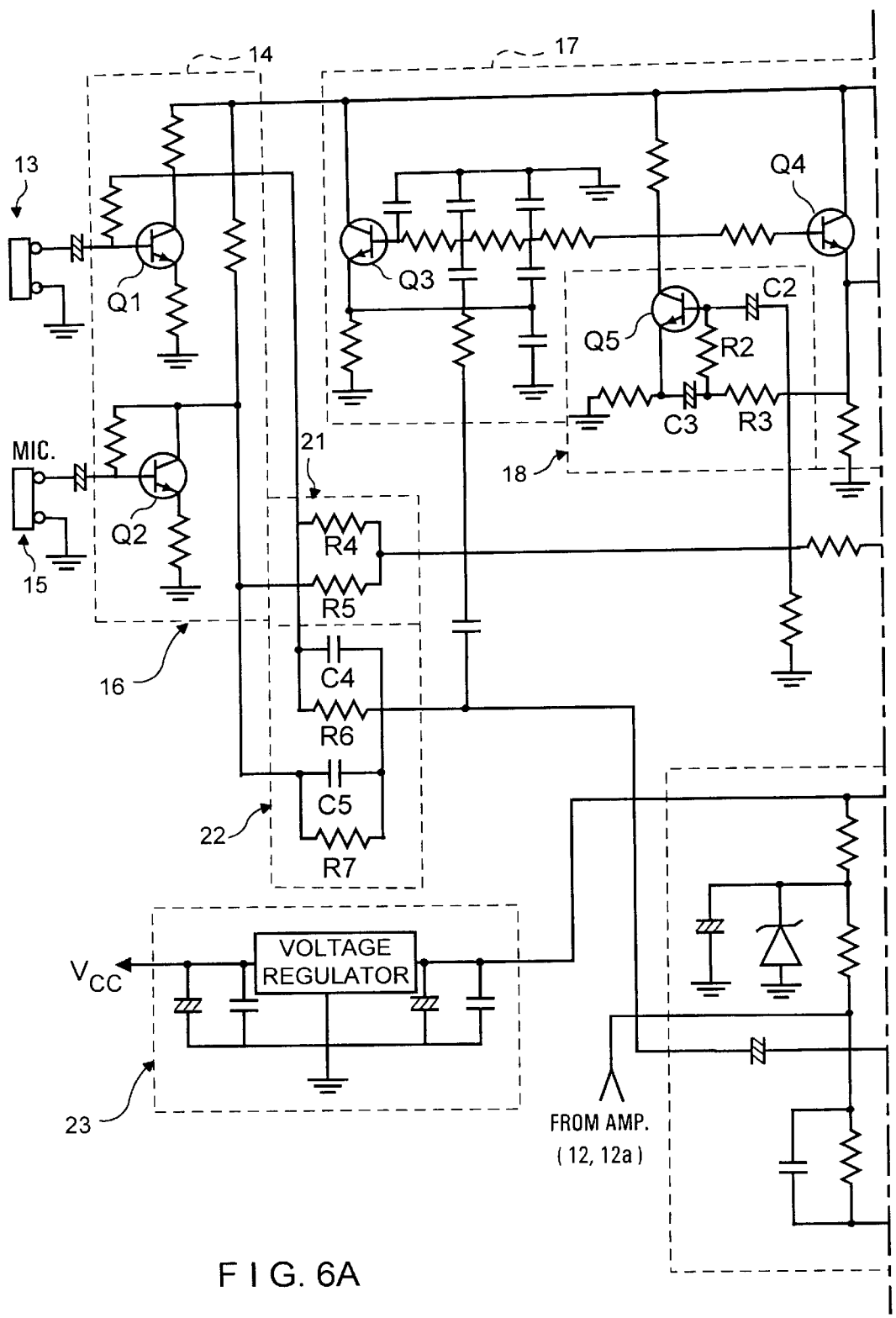
F I G. 6A

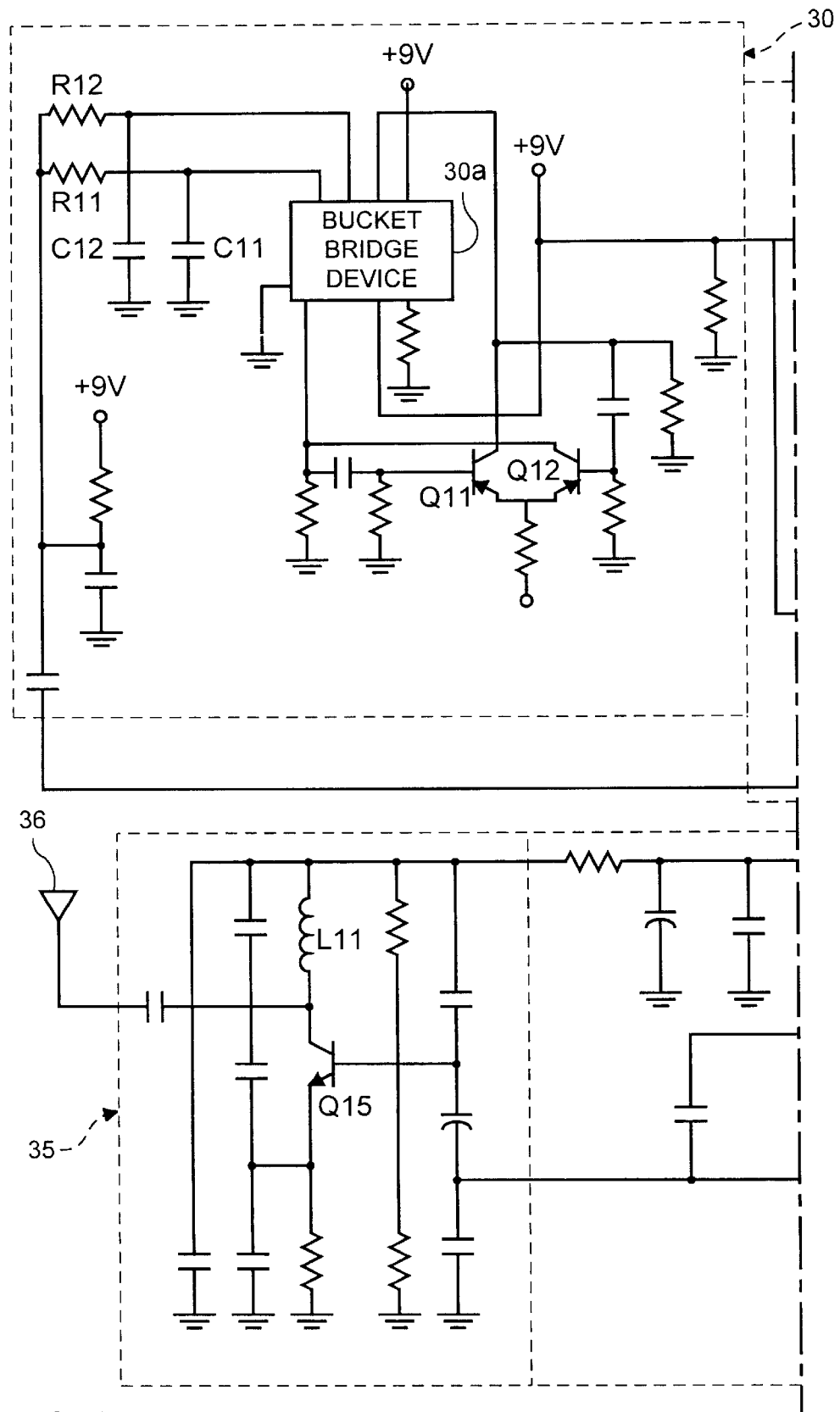
F I G. 8A

PORTABLE MUSIC PERFORMANCE DEVICE

This application is a continuation of application Ser. No. 08/382,060, filed Feb. 8, 1995 abandoned, which was a National State of PCT/KR94/00050, filed May 19, 1994.

TECHNICAL FIELD

The present invention relates to a self-contained, hand-held music broadcasting device that permits a singer to sing the lyrics of a song to the accompaniment of music stored in the device and that broadcasts the singer's performance and the recorded music by radio transmission to an ordinary radio receiver.

BACKGROUND OF THE INVENTION

As is well known, the modern musical accompaniment box, commonly called a karaoke system, is configured to play through an electronic sound system lyrics sung by a person into a microphone mixed with an accompaniment of recorded music. A karaoke system typically includes a tape or disc player for playing back the music for the songs. A person can enjoy performing a selected song by mixing his or her voice through the microphone with the reproduced musical accompaniment. Karaoke systems have become very popular with many people, young and old, who wish to sing songs to the accompaniment of chosen music to enhance their performances. There are presently a large number of restaurants and bars that have special karaoke nights and charge their customers either directly by a cover charge or indirectly through drink prices to either anticipate or simply to watch other customers using the karaoke system.

A typical karaoke system used in a bar includes a microphone, a full stereo system with a strong amplifier system which can make the mixing sound full and powerful, an echo generator to improve the sound quality of the user's voice, a separate control unit to enable the singer to control the song selection and the timing thereof and volume of the microphone and music and the tempo and pitch of the music from where he or she stands, and provides a selection of a significant number of songs. The microphone and control unit both send signals through a wire to the stereo system which plays the selected accompanying music nixed with the user's voice at the appropriate settings through the stereo system. These karaoke systems require a third party, such as a bartender in a bar, to place the singer's choice of accompanying music in the stereo system from the selection of many titles because of the data limitations of the tapes and discs. Some karaoke systems also include a television monitor to display the lyrics of the song in order for the singer to read the words during the performance.

It is possible to have a karaoke system for home use if a person had all the above listed components connected together in one place. However, to purchase every component would be very expensive for individual use. The typical karaoke system is also quite bulky when the music storage components for the selection of a significant number of songs, the stereo system with a strong amplifier to make the mixing sound full and powerful, and the separate controller are all considered. The size of the equipment and number of component parts make travel difficult, and the power requirements necessitate standard outlet plugs for most of the equipment. This places a large limitation on where the karaoke system can be used.

Another desired use of a karaoke system which provides the desired song selection and sound power by many young people today is to perform with the karaoke system while riding in a car. It is possible to attach the necessary components of a typical karaoke system to a car stereo system. However, it is not easy to transfer the system from one car to another.

Additionally, a microphone or music data storage may work with one system and not another. Therefore, the system for playing back the musical accompaniment and lyrics may not be easily transferable between systems.

Yet another desired use of a karaoke system is to perform outdoors during festival picnics or at the beach, but again the size of the equipment and component parts necessary for the desired song selection and powerful sound makes such use difficult.

In addition, some homes have more than one karaoke system. Typically, such a home way contain a main system comprising separate independent components of the karaoke system wired together. This system would generally be found in the room of the home where guests generally gather, such as the living room or family room or main entertainment room. A secondary karaoke system comprising all the components of the system placed into one large outer shell way also be found. Particularly when there are too many guests for the main guest room, a desired use of the two systems is to have one singing performance be enjoyed by guests in the different rooms of the home where karaoke systems are found. However, this would take significant rewiring of the two or more systems and the different systems typically do not provide a wiring means for having one performance through one system be heard through the other systems. Another desired use of two systems would be to combine the power of the systems in one room. However, again this would take significant rewiring of the two or more systems and the different systems typically do not provide the wiring means of combining the power of two systems.

Accordingly, a system is desired to overcome the physical limitations of existing systems such as size, power and separate component requirements and flexibility for the usage of two nearby systems and to allow a karaoke system to be taken anywhere the user goes without location restrictions.

The cost of the desired system should also not be prohibitively high so that consumers can reasonably purchase a home system.

SUMMARY OF THE INVENTION

The present invention is intended to overcome the above-described disadvantages of the conventional musical accompaniment system, or karaoke system. Therefore, it is an object of the present invention to provide a portable music performance device in which the human voice and the selected musical accompaniment can be mixed and transmitted to a common radio receiver and amplifier system. Another object Is to provide a device in which the produced musical accompaniment and the human voice are processed stereophonically. Yet another object is to provide a device which can store a multiplicity of songs and includes in the device a controller which allows the performer to control the song selection, rhythm speed, echo sound effect, and the volume of the performance broadcast from where the performer stands. Yet another object of the present invention is to provide a device that is not restricted to a certain location by either size or power limitations,that can be easily transported by a single person and can be played wherever there is a conventional radio receiver, such as a household stereo radio receiver or stereo receiver and amplifier system, or a stereo car radio, or a portable radio or miniature walkman radio. Yet another object of the invention which can transmit the human voice and music accompaniment to a home, car, portable or walkman radio with a powerful amplifier which can make the mixing sound full and powerful.

The foregoing objects are achieved, in accordance with the present invention, by a self-contained hand carried music performance device that comprises a storage medium containing data representing musical accompaniments for a multiplicity of songs, a retrieving device for retrieving the musical accompaniment data and generating a first signal representative of the musical accompaniment, a microphone for generating a second signal responsive to an audio input signal, such as the voice of a singer singing the lyrics of the song, a processor for mixing and enhancing the first and second signals to produce a third signal, and a radio transmitter for transmitting the third signal as an RF signal capable of being received by a radio receiver. The processor of the device can adjust the tone, rhythm speed, echo sound, and volume of the performance.

Preferably, the device includes song identification data associated with the musical accompaniment data associated with the musical accompaniment data in order for a person to selectively produce a desired song. The device contains a key matrix to allow a person to make a selection.

A preferred embodiment of the device contains a ROM package for memory storage of the musical accompaniment data which can store about 1200 songs. A preferred embodiment of the device also includes an outlet plug which enables additional ROM packages to be accessed by the device. This allows a user to choose his accompaniment music from a large selection stored on multiple ROM packages and does not limit the user to the original music stored in the device. Users can purchase the type of music they like and can trade ROM packages with their friends for an even greater selection.

The self-contained device is small enough to be hand carried and be easily transportable. A person could use the device anywhere a conventional FM receiver is present, whether in a car, home, or outdoors with a large portable radio or a miniature walkman radio. The device can utilize the strong amplifying power of many home,car, large portable or miniature walkman radio and amplifying systems so that the resulting sound is full and powerful. The device can provide a selection of about. 1200 songs.

The performance transmission is not limited to be received by one radio,but can be picked up by different FM receivers tuned to the same frequency, so that one performance can be heard through two or more radio and amplifying systems in the home, or in other places so that many people with personal, portable, walkman or car radios can enjoy one performance. In addition,the amplifying power of the two systems can be combined. The controller on the device gives the performer total control of the sound produced from where she stands and greatly enhances the quality of her song.

DESCRIPTION OF THE DRAWINGS

The above objects and other advantages of the present invention will become better understood by reference to the following description of an embodiment of the present invention, taken in conjunction with the attached drawings, in which.

Throughout the figures the same referece numerals and characters, unless otherwise stated, are used to denote like features, elements, components or portions of the illustrated embodimont. Moreover, while the subject invention will now be described in detail with reference to the figures, it is done so in connection with a preferred embodment. It is intended that changes and modification can be made to the described embodiment without departing from the true scope and spirit of the subject invention as defined by the appended claims.

DESCRIPTION OF THE EMBODIMENT

Figure 1:
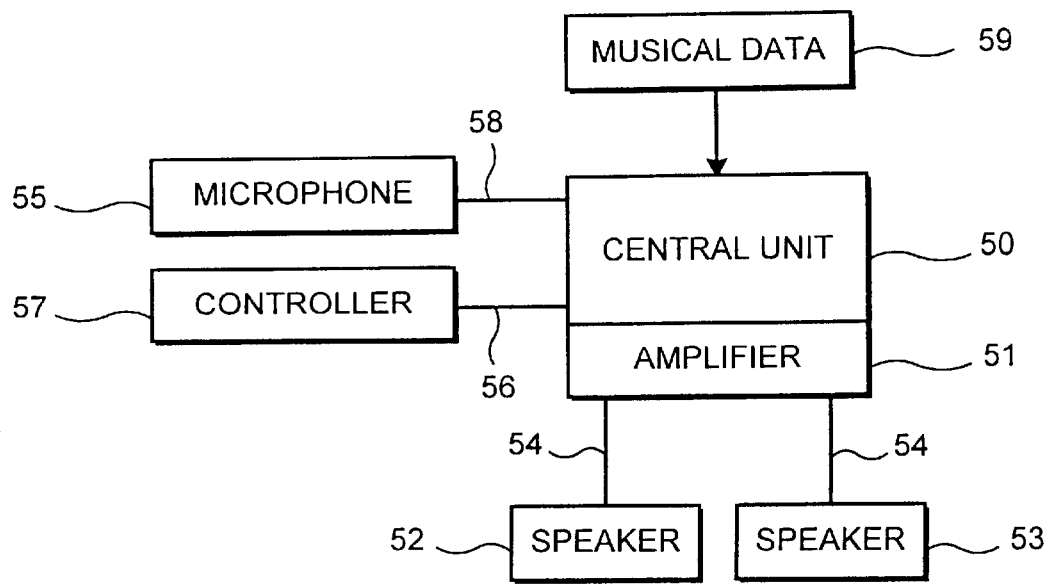
FIG. 1 is a block diagram of a typical karaoke system without lyric display that is known in the prior art.

FIG. 1 depicts a typical previously known karaoke system, except that it does not have a television monitor to display lyrics. The system consists of a central unit 50, an amplifier 51, speakers 52 and 53, a microphone 55, a controller 57, musical data 59, and wires 54, 56, and 58. The microphone 55 and controller 57 are connected to the central unit 50 by wires 56 and 58, respectively. The microphone could, however, be a wireless microphone. The musical data 59 is either stored separately in the form of tapes or compact disks to be placed into the central unit 50 and played or is stored within central unit 50. The amplifier 51 outputs a mixed signal of voice and musical accompaniment from the signals generated from the microphone and central unit, adjusted according to the controller to speakers 52, 53. The speakers 52, 53 are connected to amplifier 51 via wires 54.The conventional karaoke systems have a separate controller, a large central unit and large speakers that are not easily moveable and require multiple wire connections between the components.

These restrictions, along with a large power supply requirement, make the conventional karaoke system a stationary one that is not well adapted to be portable.

Figure 2:
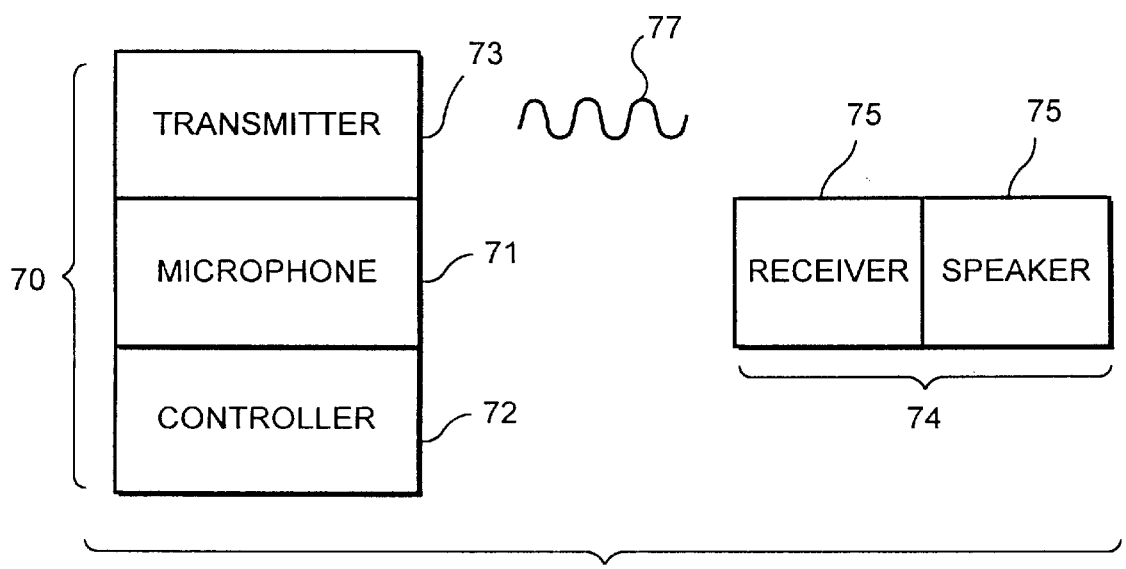
FIG. 2 is a block diagram of an embodiment of the present invention and also shows a receiver with which the embodiment is used but which is not a component of the invention.

The present invention overcomes these limitations by eliminating the need for a central unit and a sound system by combining the musical data storage, the controller and the microphone into a single self-contained, hand-held device. FIG. 2 shows schematically a karaoke system that uses the device of the present invention. The device 70 comprises a microphone portion 71, a controller portion 72, and a transmitter portion 73. The device is used with an FM receiver 74, that includes a receiver portion 75 and a speaker portion 76 for producing an audio output of the signal generated from karaoke device 70. The signal 77 is, preferably, an FM signal that is generated by the device 70 and transmitted to an FM receiver 74. The FM receiver 74 may take the form of a portable radio, a car stereo radio, a home stereo system, or any device that receives FM signals and plays them through a speaker or speakers.

Many common receiver systems will contain a strong amplifier.

Although FM frequencies are preferred, it is also possible to transmit and receive on other frequencies. The system configuration shown in FIG. 2 allows the karaoke device 70 to be easily transported and it is not restricted by multiple cables or power requirements.

The FM receiver device 74 can also be small in size, such as a portable radio, and the karaoke device 70 is not restricted to use with one receiver device. Thus, it is possible to take the device 70 from car to car or home to home and use the system wherever there is an FM receiving device.

Figure 3:
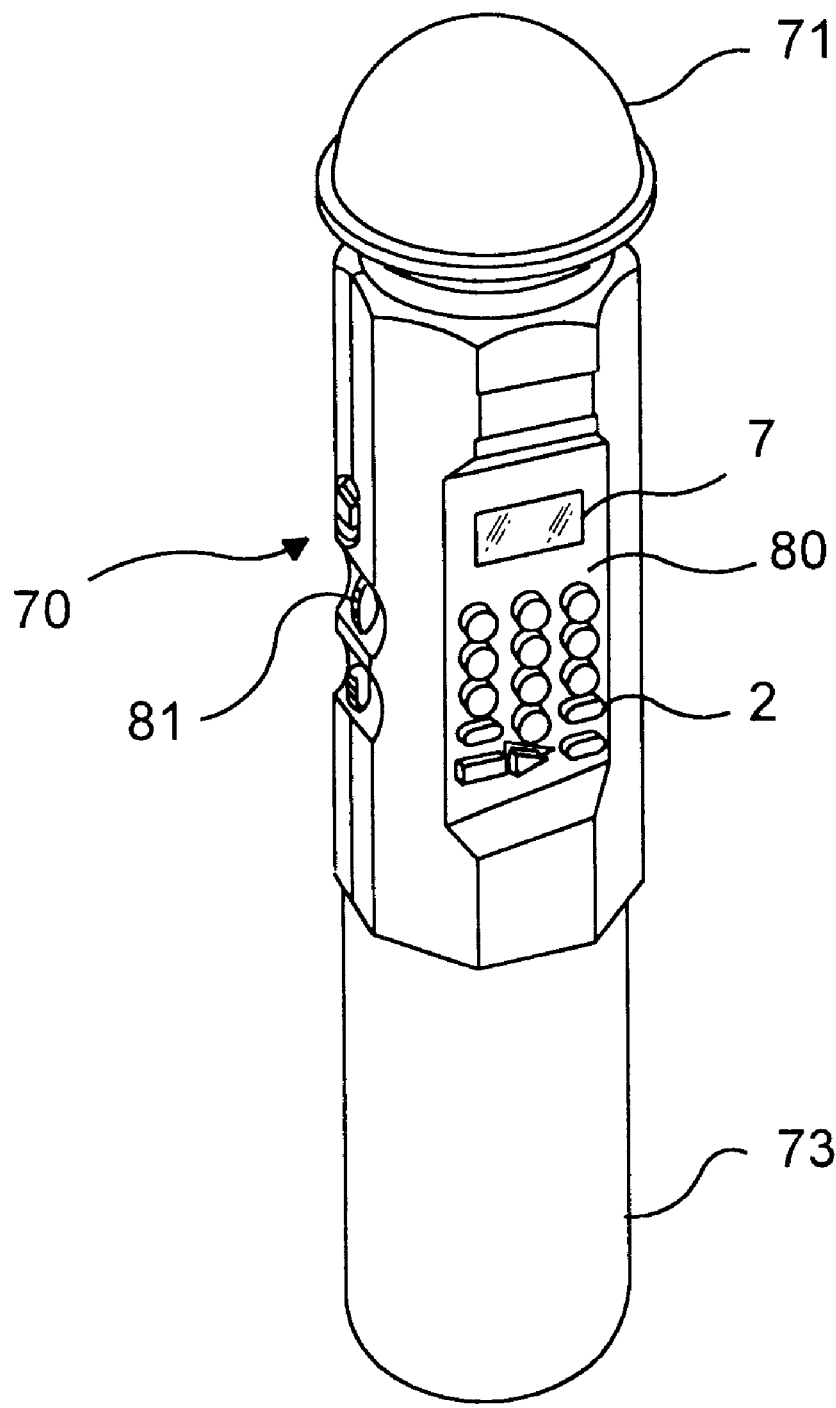
FIG. 3 is a drawing of an exemplary housing of a device according to the present invention and illustrates external control elements.

FIG. 3 depicts a suitable housing for the karaoke device 70 and some of the controls. Shown are a microphone portion 71, a control panel 80 having a key matrix 2 and a display panel 7, and additional controls 81. Transmitter 73 is stored in the base of karaoke device 70. Control panel 80 and alternate controls 81 allow the user to select a particular accompaniment song and change the acoustical characteristics of the signal as described below.

Figure 4:
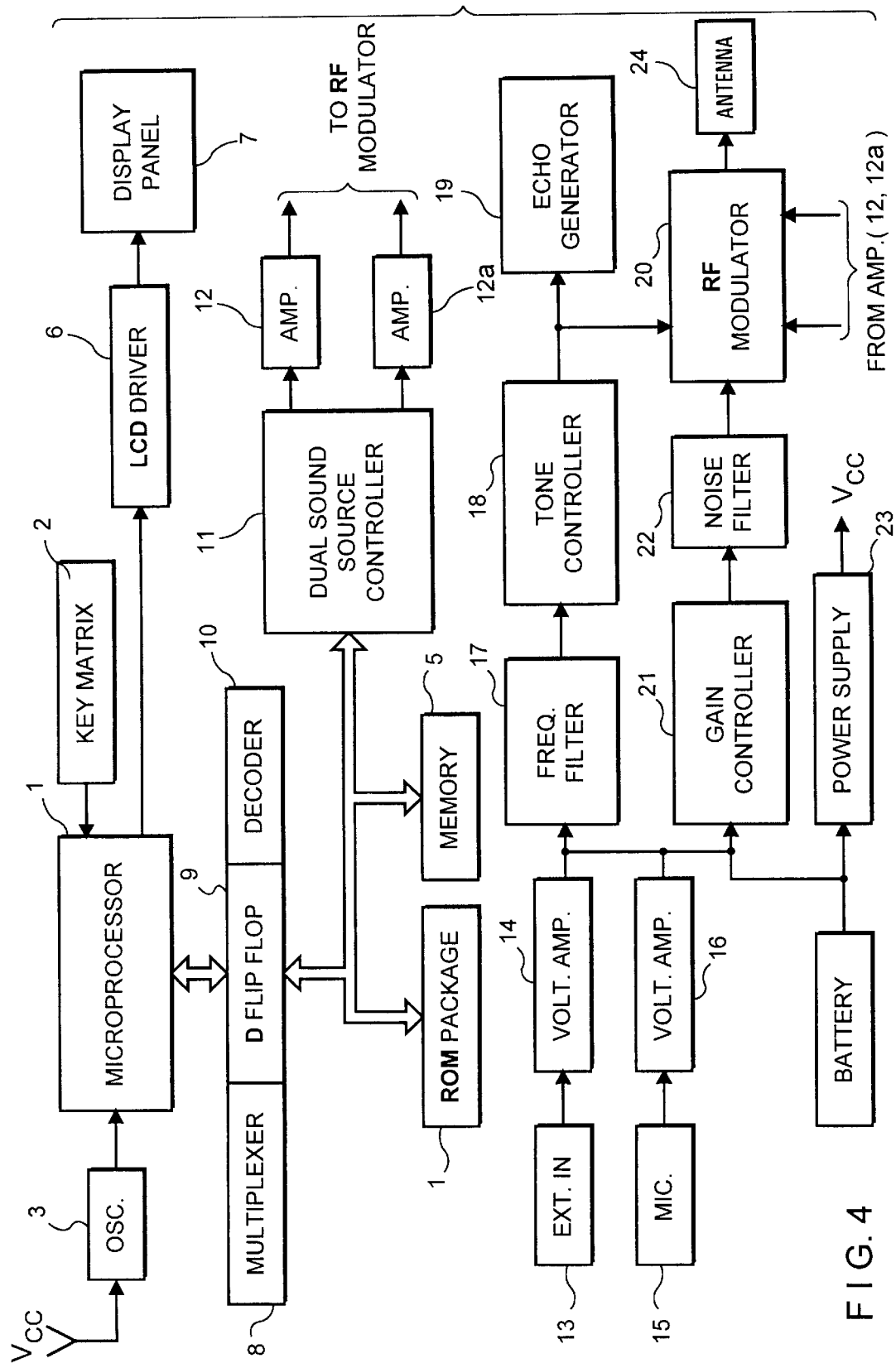
FIG. 4 is a block diagram of the embodiment.

Referring to FIG. 4, the device 70 consists of two parts, the accompaniment sound reproducer and the frequency modulator.

The accompaniment sound reproducer comprises a ROM package 1, a key matrix 2, a microprocessor 4, a memory 5, a display panel 7, a mulitiplexer 8, a dual sound source controller 11 and amplifiers 12, 12a.

Various musical accompaniments with associated title numbers are stored in the ROM package 1 in the form of digital signals.

The package can store about 1200 songs. The ROM package 1 is constructed to be expanded as such as required. Inputs from the key matrix 2 that are representative of the title number selected by the user, and high frequency timing pulses generated from the X-tal oscillator 3 are provided to the microprocessor 4, which in turn performs overall system control in accordance with the program stored in its internal memory. The program directs the musical data corresponding to the selected title number to be stored in the memory 5, which is formed by a static random access memory device. The microprocessor 4 also controls retrieval fo musical data from the ROM package 1 by way of the multiplexer 8, D-flip flop 9 and decoder 10.

Further, the microprocessor 4 generates a display of the functional status of the system on the display panel 7, through a LCD driver 6. Additionally, microprocessor 4 enables the reproduced signals of the musical accompaniment in the dual sound source controller 11 to be amplified by the amplifiers 12. 12a.

The frequency modulator section of the device 70 comprises an external audio input 13, an internal microphone 15 (corresponding to microphone 71 in FIG. 3), voltage amplifiers 14 and 16, a frequency filter 17, a tone controller 18, an echo generator 19, a radio frequency (RF) modulator 20, a gain controller 21, a noise filter 22, a power supply 23 and an antenna 24.

Audio inputs from the external input 13, which may be an external microphone, or from the internal microphone 15 are provided to the voltage amplifiers 14 and 16, respectively. The amplified audio signal is then regulated to properly select the desired waveform through the frequency filter 17 and to further select its 'high' or 'low' level tone through the tone controller 18. The audio signal produced from the tone controller 18 is mixed with an echo signal selectively produced by the echo generator 19, and the mixed audio signal is provided to the RF modulator 20 which in turn transforms the signal into a radio frequency waveform. The radio frequency waveform is of a onventional frequency modulation(FM) band signal type. The above mentioned amplified audio signal is additionally controlled to enhance its differential gain and differential phase by the gain controller 21 and subsequently to increase the S/N ratio by passing the gain controlled signal through the noise filter 22 and reducing noise present in the signal. The reduced noise signal is then passed to modulator 20 to be combined with the voice audio signal.

The controlled audio input signals and the reproduced musical accompaniment signal from the amplifier 12 and 12a are simultaneously applied to the RF modulator 20, and the FM modulated output signal carrying the human voice and musical accompaniment is transmitted via the antenna 24 to common FM receivers.

Figure 5:
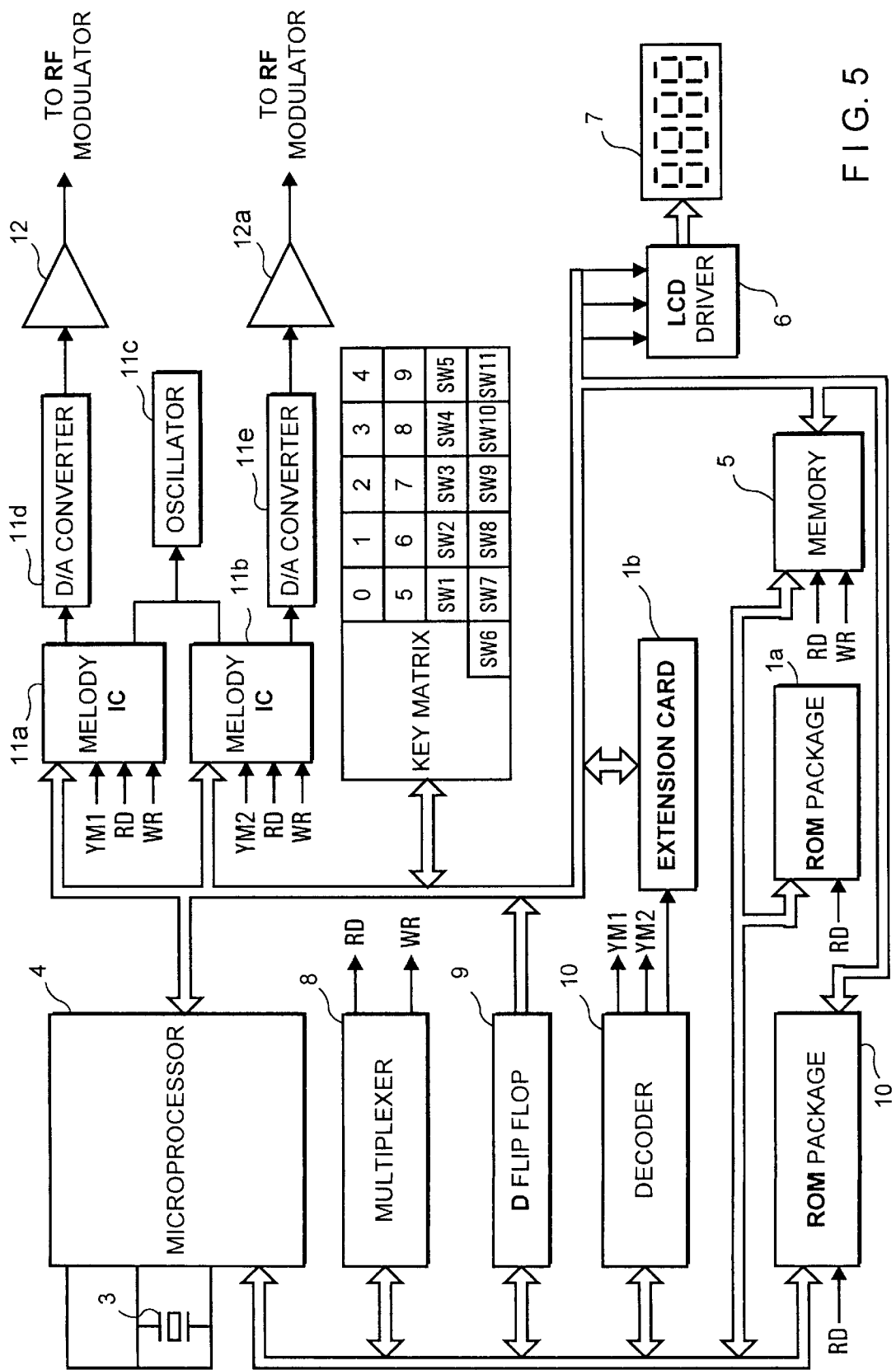
FIG. 5 is a schematic diagram of the sound reproducer portion of the embodiment.

Referring to FIG. 5, a more detailed diagram of the accompaniment sound reproducer of FIG. 4 is shown. The ROM package 1 for digitally storing various musical accompaniments and their associated title numbers has an additional ROM package 1a coupled to a extension outlet 1b which allows additional RON packages to be inserted. The use of the external, plug-in ROM packages permits as many musical accompaniments as desired to be accessed by the device in addition to the internal ROM packages.

The ROM packages can be stored separately from the karaoke apparatus and be selectively connecte d to the system, thus enabling the user to choose ROM packages according to his own musical tastes.

The key matrix 2 has numeric keys 0 to 9 for selecting a desired song title number, a rhythm speed controller key SW1, a musical interval controller key SW2 for changing musical tone, adjustment up and down keys SW3, SW4 for adjusting the rhythm speed and the musical tone to the desired value when music is being played and the keys SW1 and SW2 are actuated, respectively.

The key matrix 2 also includes a reset button SW5 for restoring the system to its normal or initial state when the operator encounters troubles in operation or makes a mistake in selecting a key, a continuous play key SW6 for continuously playing the accompaniment music stored in the ROM package without further selection of a song title a ROM package selection key SW7 for choosing any of the extensible ROM packages when they are connected to the extension outlet 1b, an echo button SW8 for obtaining an echo effect of the voice input from the microphone, a start or play button SW9 for playing the selected musical accompaniment, a stop button SW10 for interrupting the play of the musical accompaniment in order to change the title of the selection, and a power switch SW11 for supplying power to the system by enabling power source 23, which is powered by a power supply, which may be an internal battery.

Inputs from the key matrix 2 and the timing pulses generated by the X-tal oscillator 3 are provided to the microprocessor 4, which in turn performs overall system control in accordance with the program routine which will be described below. Microprocessor 4 stores the data corresponding to the selected musical accompaniment into the memory 5. At the same time, the microprocessor 4 provides a serial data output signal, a clock signal and a LCD load signal to the LCD driver 6 selectively via the internal data bus 50 and generates a seven-segment display of the functional status on the display panel 7.

When the microprocessor 4 selects a particular data item, such as accompaniment music, among the stored data in ROM package 1 or ROM package 1a through the internal data bus 50, the selected data is written to or read from the memory 5 via the multiplexer 8 and decoder 10, while the output data is latched by the D-flip flop 9. The output signals, that is the chip selection signals YM1, YM2 from the decoder 10 and a read and write signals RD3, WR4 from the multiplexer 8, are provided to the dual sound source controller 11 via the internal data bus 90. Dual sound source control 11 comprises two melody Integrated circuits (ICs) 11a and 11b, an oscillator 11c, and two digital to analog (D/A) converters 11d and 11e. Responsive thereto, the melody ICs 11a and 11b generate rhythm signals stereophonically based on the retrieved musical data from the ROM package 1 or 1a. The output signals of the melody integrated circuits 11a and 11b are each sampled through D/A converters 11a, 11e to obtain analong signals corresponding to the original musical accompaniment. The outputs from the D/A converters 11d, 11e are amplified through the amplifiers 12, 12a, as required by the radio frequency modulator 20.

Figure 6B:
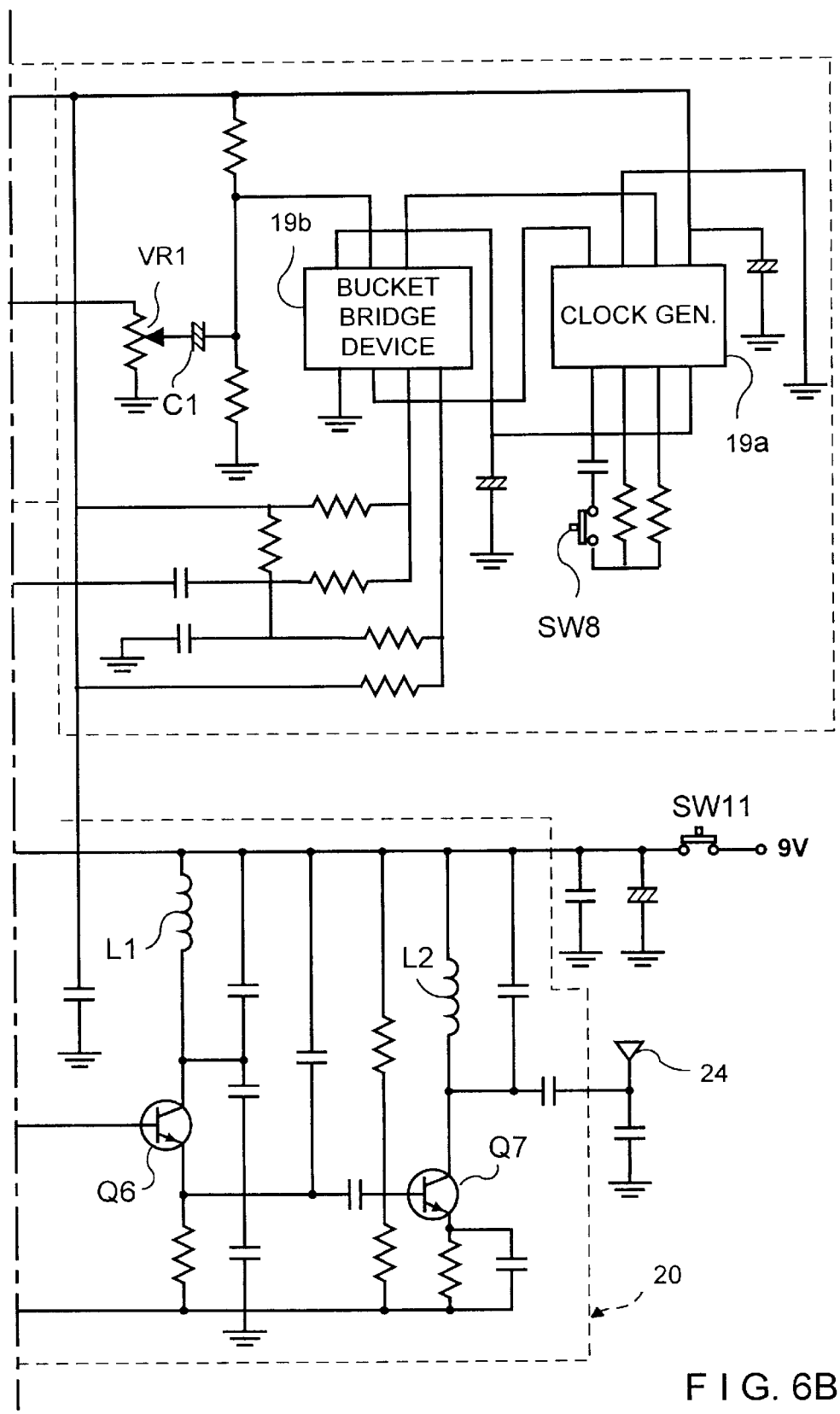
FIG. 6 is a circuit diagram of a frequency modulator of the embodiment.

FIG. 6 depicts a detailed circuit diagram of the frequency modulator section of the device 70. Audio inputs from the external input 13, supplied by an external microphone or from the internal microphone 15 are provided to the voltage amplifiers 14, 16 which include transistors Q1, Q2, respectively, in order to obtain a proper input level. Each amplified audio input signal is filtered by way of two transistors Q3, Q4 of the frequency filter 17, and properly shaped through the tone controller 18 which includes a transistor Q5, resistors R2, R3 and capacitors C2, C3.

The audio input signal, which is selectively shaped relative to its 'high' or 'low' level tone, is supplied to the RF modulator 20, which also receives the output signal from the echo generator 19. Generator 19 is of conventional design and includes a clock 19a and a bucket bridge device 19b and generates an echo sound of delayed low noise output for the time constant which is determined by a variable resistor VR1, a capacitor C1 and a resistor R1.

An echo sound is produced only when the echo button SW8 of the key matrix 2 is actuated.

The amplified audio input signal from the voltage amplifiers 14 or 16 is controlled to enhance its differential gain and phase through the gain controller 21 which consists of the divider resistors R4 and R5. Subsequently, the S/N ratio of the signal is increased by removing noise components through the noise filter 22 which consists of the combination of resistors and capacitors R6, C4 and R7, C5 shown in FIG. 6. The processed audio signal is mixed with and echo sound selectively produced in the echo generator 19, and the controlled audio input signal and the reproduced musical accompaniment signal from the amplifiers 12 and 12a are simultaneously provided to the RF modulator 20, which converts the audio input signal into the radio frequeney designated to be of a conventional FM band by way of an IFT coil L1 and a transistor Q6. The radio frequency signal is then fine tuned in RF modulator 20 by a reactor coil L2 and a transistor Q7. Finally, the FM modulated output signal carrying the human voice and musical accompaniment can be transmitted through the antenna 24, and received by FM receivers tuned to the output frequency of the device.

Figure 7A:
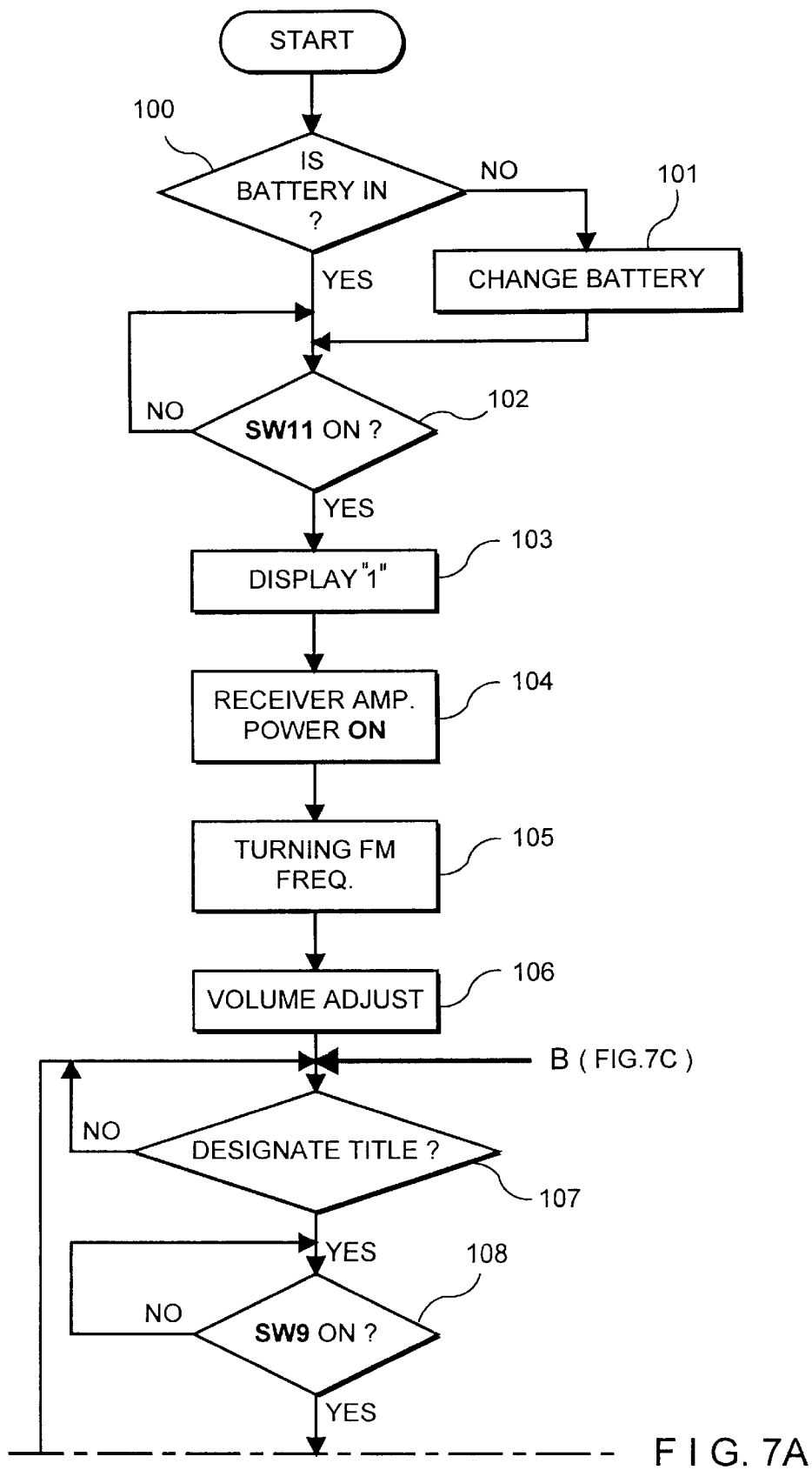
FIG. 7 is a flow diagram representative of computer program instructions to be executed by the microprocessor of FIG. 4 for carrying out control functions of the embodiment.
Figure 7B:
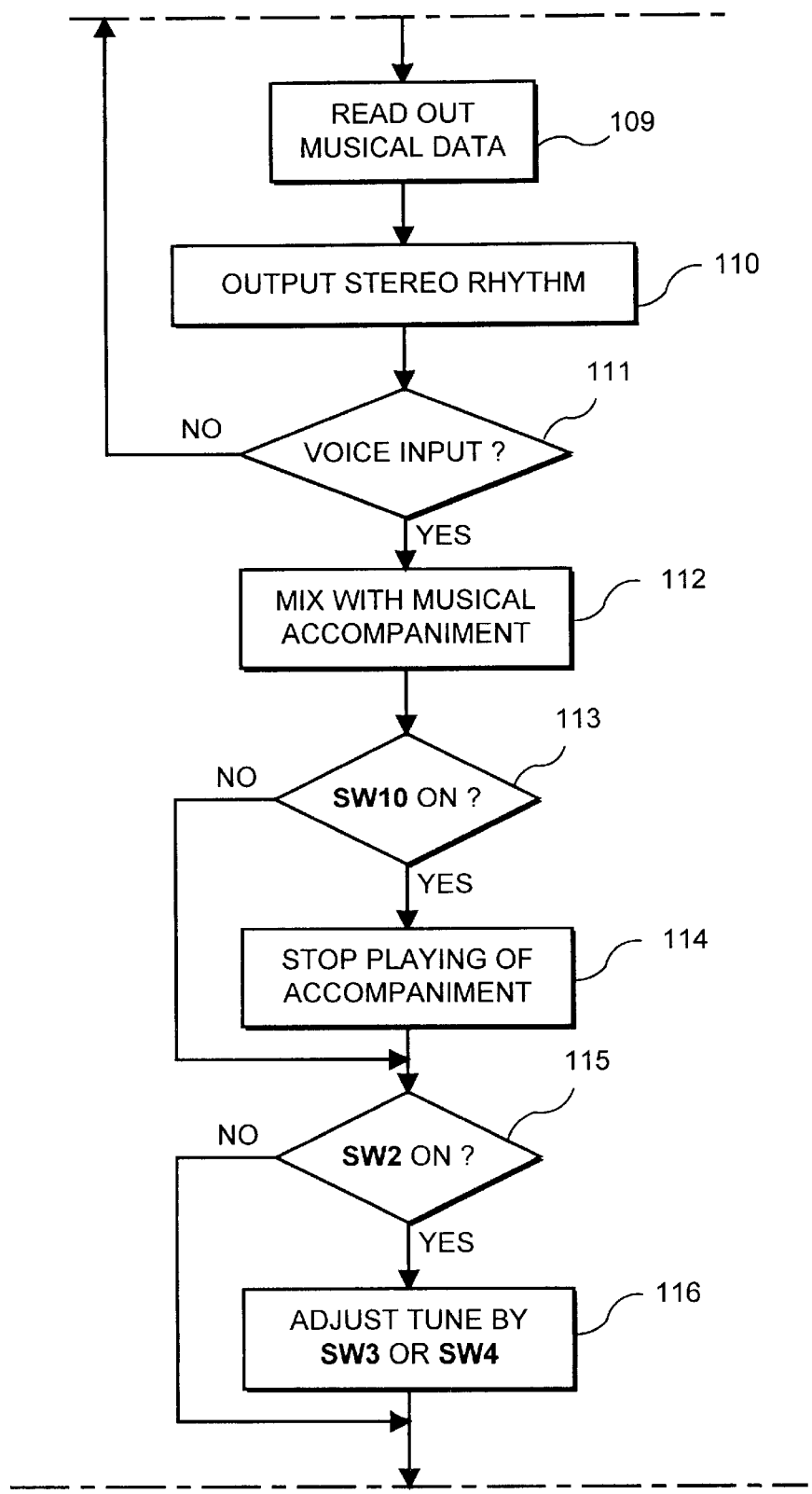
Figure 7C:
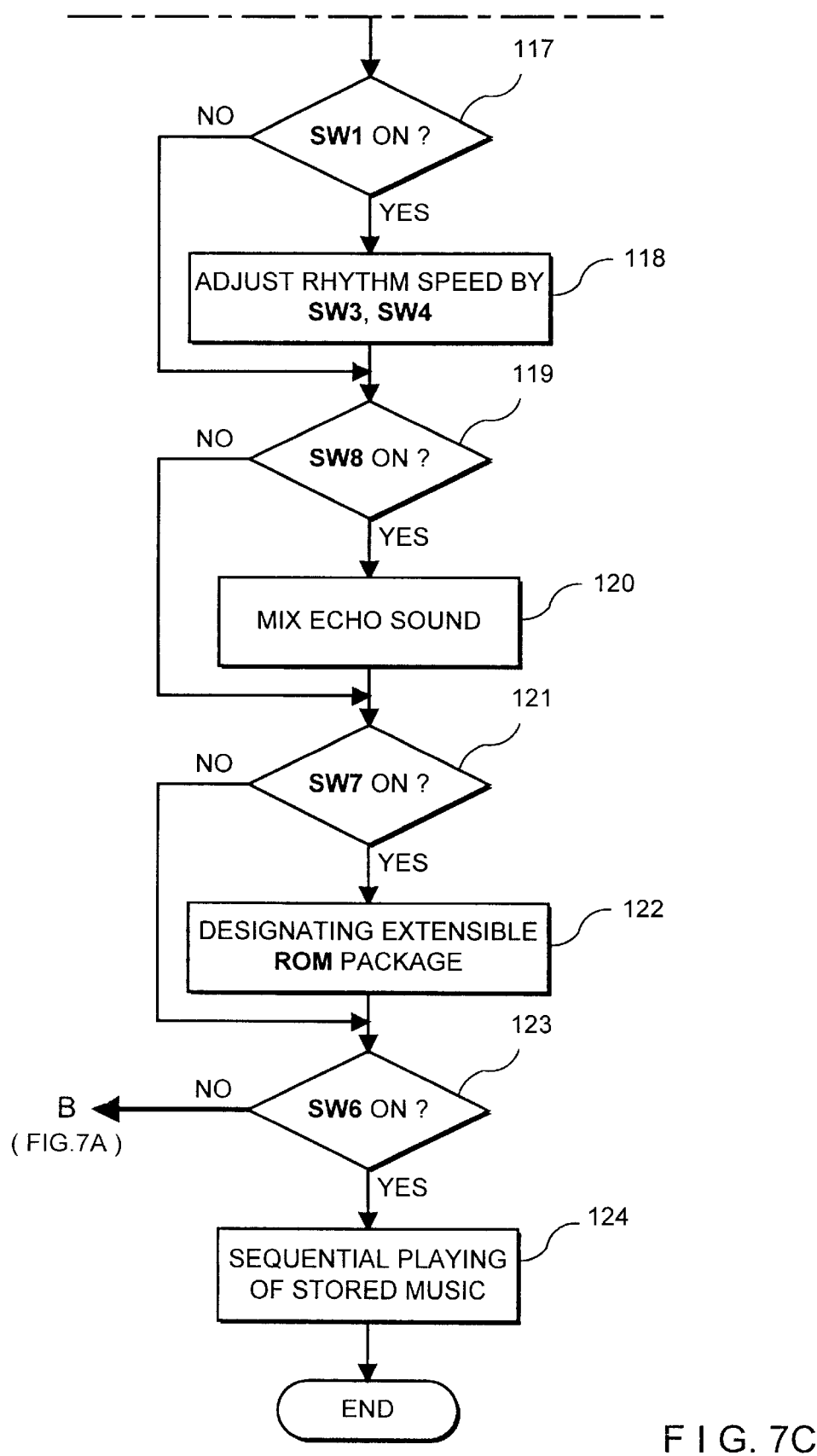

In this embodiment, the power supply voltage from the internal battery (for example 9 V)is directly applied to the audio amplifier and the RF modulator, and an operating voltage (Vcc) of 5 V is supplied to the other part of the circuit by way of a voltage requlator IC in the power supply 23 when the power switch SW11 in the key matrix 2 is actuated. FIG. 7 depicts a flow diagram representative of program instructions executed by the microprocessor 4 of FIG. 4 for carrying out the control functions in accordance with this invention. In step 100, a determination is performed as to whether the proper power source, a 9 V battery in the embodiment, is included. If the required power is not available, then a charge or replacement of the proper power source is required in step 101. If the power switch SW11 is detected to be in a 'ON' state in step 102, them microprocessor 4 provides in step 103 a data signal LCD DATA, a clock signal LCD CLK, a load signal LCD LDP to the LCD driver 6 and displays "1" in the display panel 7, representing normal operating voltage Vcc supplied from the power supply 23.

In order to use the microphone/RF signal generator. additional steps are required to be performed. These steps include activating the remote FM receivers and amplifiers in step 104 and tuning to the predetermined frequency in step 105 (for example 98.1±1 MHz or 100±1 MHz) and adjusting the proper volume level of the amplifier in step 108. If the numeric key inputs from the key matrix 2 designating the desired song title is received in step 107, one of the ROM packages 1 or 1a is selected according to the condition of SW7 by the multiplexer 8 and the corresponding stored data is retrieved by way of the data bus 90. A determination is made whether the play button SW9 is actuated in step 108, and If the play button is ON, the stored musical data are read out by selectively latching the data through the D-Flip Flop 9 in step 109.

The retrieved digital data from the ROM packages 1 or 1a are provided to the melody ICs 11a, 11b of t he dual sound source controller 11 through the multiplexer 8. The melody ICs 11a 11b produce outputs of stereophonic rhythm on the basis of the output from the oscillator 11c, to be supplied to the respective D/A converters 11d, 11e in which the data are sampled and converted into analog signals. The analog outputs are supplied to the amplifiers 12a, 12b and the amplified analog musical accompaniment signals are supplied to the RF modulator 20 in step 110 for converting them into the FM radio frequency signals to be transmitted through the antenna 24.

The subsequent step 111 determines whether a signal exists on the voice inputs from the external or internal microphone. If the user desires to sing to a musical accompaniment retrieved from the memory of the invention, the voice Input signal is mixed with the musical accompaniment signal at step 112.

If the stop button SW10 in the key matrix 2 is actuated in step 113 during the above operation, the playing of the selected musical accompaniment is stopped in step 114. In step 115, if the musical tone of the accompaniment is desired to be changed, and the musical interval controlling key SW2 is actuated, then the tone of the tune is adjusted to the desired value during the play of the music. The control adjustment up and down keys SW3 and SW4 are operated to select the proper level in step 116.

If the rhythm speed controlling key SW1 has been actuated in step 117. the operation of adjustment up and down keys SW3 and SW4 allows the rhythm speed to be faster or slower by pushing the respective key as many times as required in step 118. In the coures of the above musical interval and rhythm speed controlling process, the microprocessor 4 performs a display process showing the adjustment value through the display panel 7.

In step 119, if it is found that the echo button SW8 is actuated for obtaining an echo effect of the voice input from the microphone, an echo sound signal produced by the echo generator 19 is applied to the RF modulator 20 and mixed with the demodulated signal in step 120. In step 121, if it is found that the RON package designation key SW7 is actuated and the extensible ROM packages 1*a* are provided, the desired extensible ROM package is selected by way of the multiplexer 8 in step 122, and the selection of the desired musical accompaniment is permitted. Each ROM package ray contain a particular type of music, such as country or pop, may be a collection of favorite songs, or may be from a particular artist or artists. There are many variations for the contents of the ROM packages.

If the continuous play key SW6 is actuated in step 123, the sequential playing of the accompaniment music stored in the ROM packages 1 or 1*a* is performed in step 124 without the need for a selection of a song title. The device 70 according to the present invention can selectively process the audio input signals containing a voice and the retrieved musical accompaniment to provide a mixed signal and transmit then on a FM channel in a stereophonic manner. This configuration of a self-contained karaoke device that is used with common FM receivers allows for an and portable use that can be played in a room, outdoors, or in a moving vehicle, wherever a FM receiver is located. A user can even sing songs accompanied by the music while walking outdoors and using a small portable radio to receive the transmitted signals.

Figure 8B:
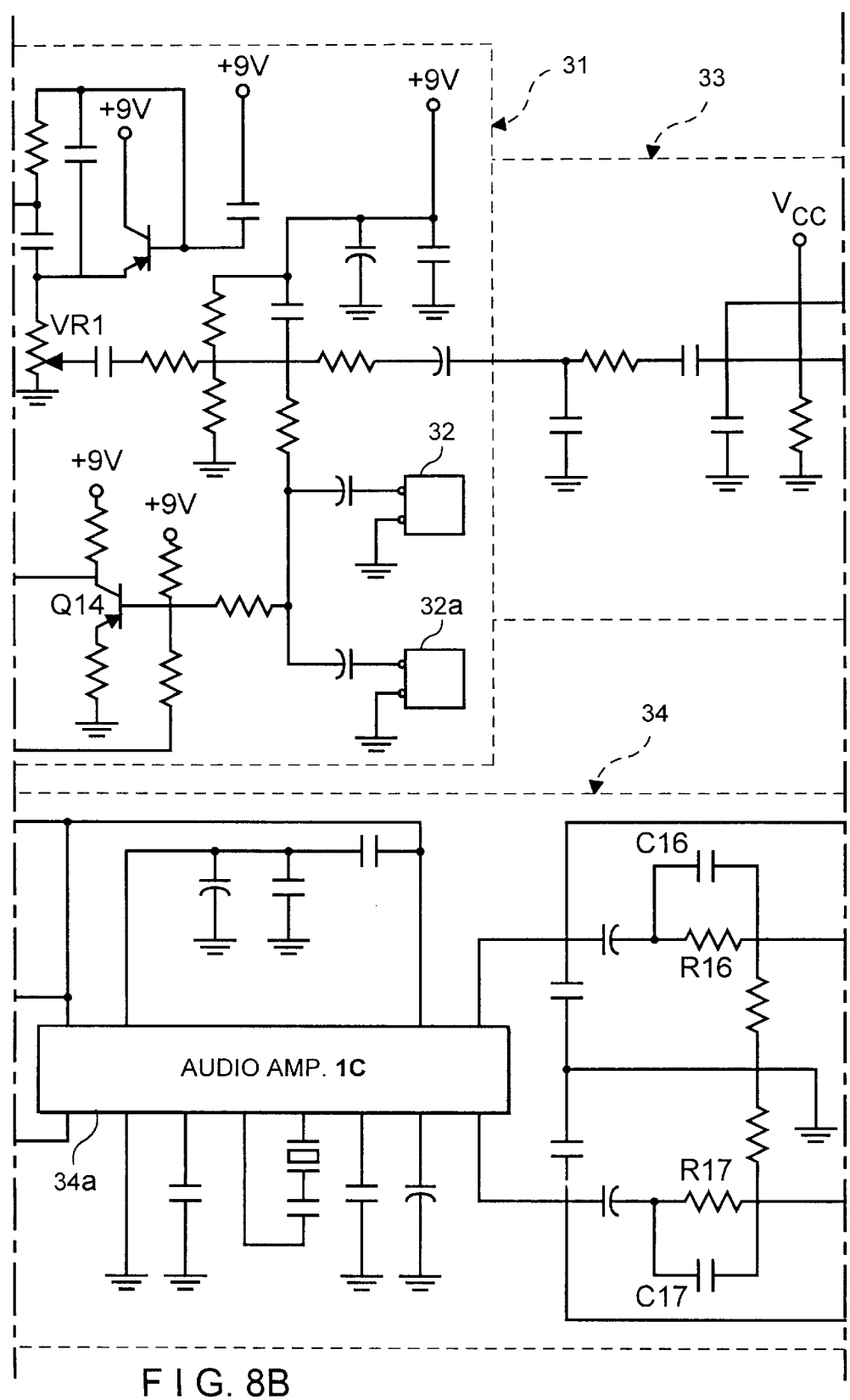
FIG. 8 is a circuit diagram of a second embodiment of a frequency modulator useful in a device of the present invention.
Figure 8C:
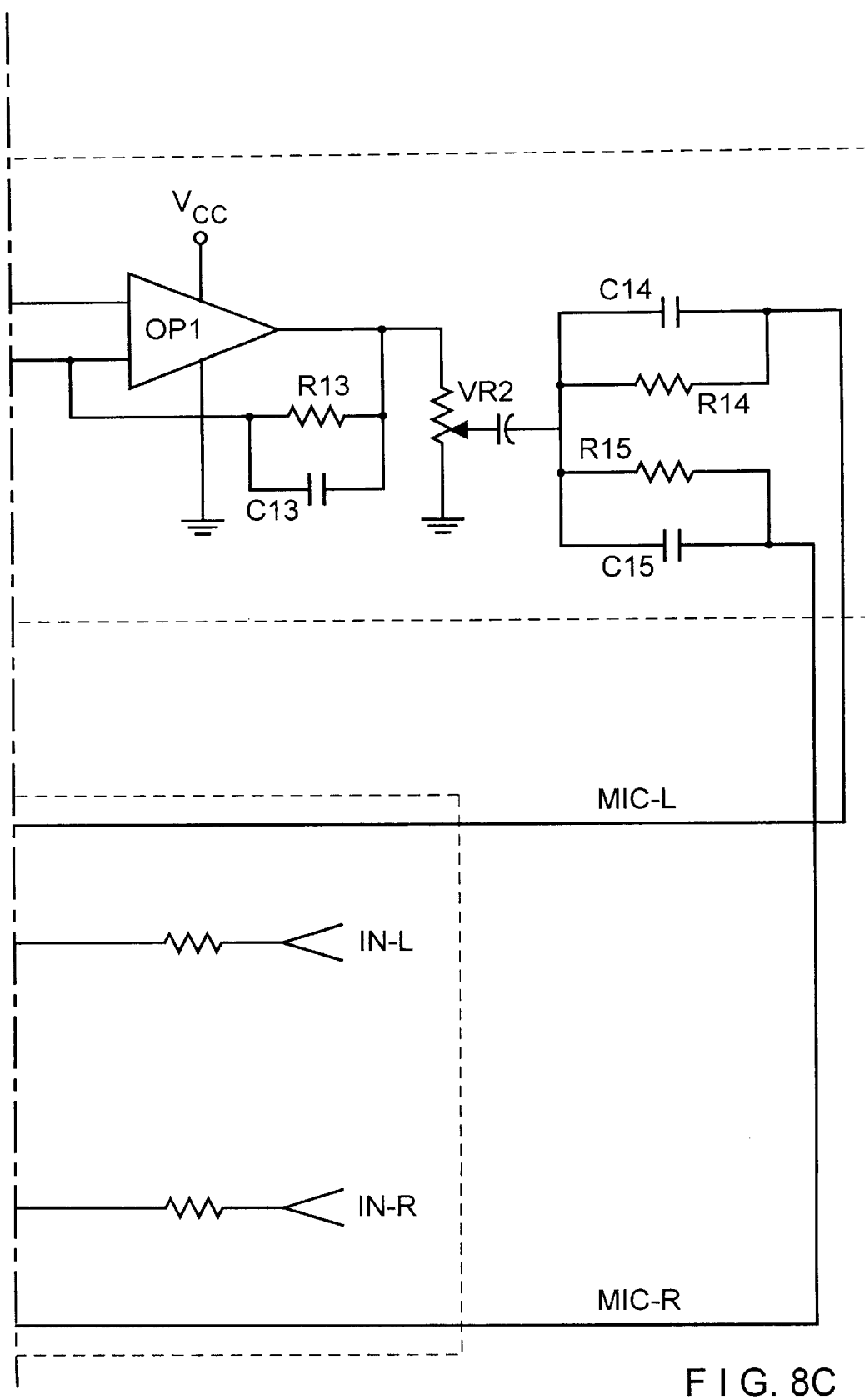

FIG. 8 depicts a circuit diagram of a second embodiment of the frequency modulator section of FIG. 6. The frequency modulator section of FIG. 8 comprises an echo generator 30, a tone controller 31, a gain controller 33, a noise filter 34, a RF modulator 35 and an antenna 36. The echo generator 30 includes a bucket bridge device 30*a* connected with resistors R11, R12, and capacitors C11, C12 for generating an echo sound signal delayed for the time constant determined by the value of R11, R12 and C11, C12, and for amplifying the echo sound signal by way of the push-pull transistors Q11 and Q12.

The echo sound output is supplied to the tone controller 31 in order to control the amplification rate of transistor Q13 by adjusting a variable resistor VR11, and to mix with the voice inputs from the stereophonic microphone input terminals 32 and 32*a*. The echo sound output signal is also controlled by a transistor Q14 relative to the voice input level.

A voice input signal mixed with the echo sound, when selected, is provided to the gain controller 33 which includes an operational amplifier OP1 having a feedback loop consisting of a resistor R13 and a capacitor C13. a volume adjusting variable resistor VR2, and a filter which consists of resistors R14, R15 and capacitors C14, C15. The amplified input signal processed by the operational amplifier OP1 maintains a proper volume leve by the adjustment of a variable resistor VR2. The voice input signal is then divided into stereophonic audio signals MIC-L and MIC-R by the filter.

The stereophonic audio signals MIC-L and MIC-R are mixed with the reproduced musical accompaniment signals IN-L and IN-R, respectively, which are passed through a noise filter consisting of resistors R16, R17 and capacitors C16, C17. This mixed signal is fully amplified by a audio amplification IC 34*a*, and is converted by the RF modulator 35 and fine tuned by a radio frequency generated from an oscillator consisting of an inductor L11 and a transistor Q15.

Thus, the modulated output signal carrying the human voice and melody accompaniment can be trasmitted through the antenna 36, and be able to be received by common FM receivers within range of the transmission. The power supply voltage from the internal power source, a 9 V battery in this embodiment, is directly applied to the audio amplifier and the RF modulator, and by way of a voltage regulator in the power supply (not shown), an operating voltage (Vcc) of 5 V is supplied to the other part of the circuit when the power switch SW11 in the key matrix 2 is actuated.

The foregoing merely illustrates the principles of the invention. It will thus be appreciated that those skilled in the art will be able to devise numerous systems and methods which, although not explicitly shown of described herein, embody the principles of the invention and thus fall within the spirit and scope of the invention.

For example, the device according to this invention can be manufactured with equivalent integrated chip devices for each functional section that will result in a more compact size system This will help enable the system to be easily transported and allow a user to carry it in one hand.

I claim:

1. A portable, self-contained hand-carried music performance device for wirelessly transmitting musical accompaniment information stored in a storage medium therein and a voice input from a user, for reception and reproduction by an external receiver and speaker unit, comprising;

an elongated casing having a first end portion, a middle portion and a second end portion, said middle portion being configured to gripped by a single hand of a user and defining a space for containing the storage medium, the storage medium containing data representing musical accompaniments for a multiplicity of songs, including song identifier data associated with the musical accompaniment data for each song, control means mounted on said middle portion of said casing and electrically connected to said music storage medium, said control means being operable by a person for accessing a selected song by selecting the song identifier data associated with that song, retrieving means disposed within said casing and electrically connected to said storage medium for retrieving the musical accompaniment data and generating a first electrical signal representative of the musical accompaniment, a microprocessor unit disposed within said casing and electrically connected to said storage medium and said retrieving means for performing predetermined control operations, a microphone unit mounted on said second end portion of said casing for generating a second electrical signal responsive to a voice audio input signal from the user, a mixer disposed in said casing and connected electrically to said microphone unit, said microprocessor and said retrieving means for mixing said first and second electrical signals to produce a third electrical signal, and a transmitter disposed in said casing for wirelessly transmitting said third electrical signal as an RF signal capable of being received and reproduced by said external receiver and speaker unit.

2. The portable music performance device according to claim 1, wherein said control means comprises a key matrix for inputting song identifier and adjusting acoustic characteristics of said audio input signal.

3. The portable music performance device according to claim 1, wherein the musical accompaniment data is stored in the storage medium in digital form.

4. The portable music performance device according to claim 3, wherein said storage medium comprises a ROM package.

5. The portable music performance device according to claim 4, wherein the ROM package includes an outlet plug to accept other separate ROM packages.

6. The portable music performance device according to claim 1, wherein said retrieving means includes a microprocessor for performing predetermined control operations.

7. The portable music performance device according to claim 1, wherein said microprocessor unit further includes a tone controller.

8. The portable music performance device according to claim 1, wherein said microprocessor unit further includes a dual sound source controller for adjusting the rhythm speed of the musical accompaniment.

9. The portable music performance device according to claim 1, wherein said microprocessor unit further includes an echo generator.

10. The portable music performance device according to claim 1, wherein said microprocessor unit further includes a gain controller.

11. The portable music performance device according to claim 1, wherein said microprocessor unit further includes a noise filter.

12. The portable music performance device according to claim 1, wherein said transmitter includes an RF modulator for converting said third electrical signal into a modulated radio frequency signal and an antenna for transmitting said radio frequency signal.

13. The portable music performance device according to claim 1, wherein the storage medium is a ROM package having the musical accompaniments and associated title numbers stored therein in the form of digital signals; the retrieving means includes a key matrix for selecting a desired song title number and for providing control signals for adjusting acoustic characteristics of the audio signal, the retrieving means includes a microprocessor for performing predetermined control operations in accordance with the program routine stored in the microprocessor's internal memory when inputs from the key matrix are received and for selecting the musical data stored in the memory through a multiplexer and decoder, and the device further includes a display panel for displaying the functional status of the system through an LCD driver.

14. The music performance device according to claim 13, wherein the microprocessor unit further includes: a dual sound source controller for generating rhythm signals stereophonically on the basis of retrieved musical data from the ROM package latched by a D-flip flop through two melody ICs; voltage amplifiers for amplifying audio inputs from an external input terminal connected to an external microphone or from an internal microphone, a tone controller for shaping waveforms of the amplified audio input signal, an echo generator for selectively generating an echo sound of a delayed low noise output with respect to the audio input signal; a gain controller for enhancing the differential gain and differential phase of the audio input from the voltage amplifiers; and a noise filter for increasing the signal to noise ratio of the output signal of the gain controller by removing noise components contained in the output signal.

15. The portable music performance device according to claim 14, wherein the transmitter further comprises an RF modulator for converting the audio input signal mixed with the echo sound selectively produced in the echo generator and the reproduced musical accompaniment signal from the dual sound source controller into a radio frequency signal modulated to be transmitted through an antenna.

16. The portable music performance device according to claim 15, wherein the ROM package further comprise an outlet plug for inserting separate ROM packages.

17. The portable music performance device according to claim 16, wherein said key matrix further comprises; numeric keys 0 to 9 for selecting a desired song title number, a rhythm speed controlling key, a musical interval controlling key, adjustment up and down keys for adjusting the rhythm speed and the tone at the desired value when the music is in play, a reset button for restoring the system to its normal or initial state when it encounters trouble in operation or mistakes in selecting a key, a continuous play key for continuously playing the accompaniment music stored in the ROM package without selection of a song title, a ROM package designation key for selecting any one of the separate ROM packages, an echo button for obtaining echo effect of the voice input from the microphone, a start or play button for the playing of the selected musical accompaniment, and a power switch for supplying the power source to the system from an internal battery.

18. The portable music performance device according to claim 15, further comprising a frequency modulator which includes the echo generator having a bucket bridge device for generating an echo sound signal and for amplifying the echo sound signal by way of push-pull transistors, the tone controller for controlling the amplification rate of the echo sound signal by adjusting a variable resistor of the echo generator and for mixing the voice inputs from the stereophonic microphone input terminals, the gain controller having an operational amplifier, a volume adjusting variable resistor, and a filter consisting of resistors and capacitors for allowing the amplified input signal through the operational amplifier to have a proper volume level by adjusting the variable resistor and for dividing the voice input signal into stereophonic audio signals through the filter, and the RF modulator for mixing the stereophonic audio signals with the inputs of the reproduced musical accompaniment signals passed through a noise filter consisting of resistors and capacitors and for fine tuning by a radio frequency generated from the oscillator consisting of an inductor and for transmitting the modulated output signal carrying the human voice and melody accompaniment through the antenna.

19. The portable music performance device according to claim 18, wherein said RF modulator converts the audio input signal mixed with the reproduced musical accompaniment into the radio frequency designated to one of the conventional FM channel frequencies, and the radio frequency signal is then fine tuned and transmitted through the antenna, so that it can be received by common FM receivers.

20. The portable music performance device according to claim 15, wherein said RF modulator converts the audio input signal mixed with the Oreproduced musical accompaniment into the radio frequency designated to one of the conventional FM channel frequencies, and the radio frequency signal is then fine tuned and transmitted through the antenna, so that it can be received by common FM receivers.

21. The portable device according to claim 1, wherein said microprocessor unit transforms the music data of a selected one of the music pieces into MIDI information and said retrieving means comprises a MIDI sound source module disposed in said casing and connected electrically to said microprocessor unit, said MIDI sound source module receiving said MIDI information from said microprocessor unit and transforming said MIDI information into a second electrical signal.

22. A portable, hand-carried music performance device capable of transmitting wirelessly both musical accompaniment information stored therein in a storage medium and a voice input from a user for reception and reproduction by an external speaker unit, the musical accompaniment information including music data of a plurality of music pieces, said portable apparatus comprising:

an elongated casing having a first end portion, a second end portion and an intermediate portion between said first and second end portions, said first and second end portions and said intermediate portion being substantially similar in cross section, said first end portion being adapted to be gripped by one hand of the user and confining a receiving space for receiving removably the storage medium therein;

a microphone unit mounted on said second end portion of said casing for transforming the voice input from the user to a first electrical signal;

a central processor unit disposed in said casing and connectable electrically to the storage medium, said processor unit transforming the music data of a selected one of the music pieces into MIDI information;

a keyboard mounted in said intermediate portion of said casing and connected electrically to said processor unit, said keyboard being operable so as to control said processor unit so as to retrieve the music data of the selected one of the music pieces from the storage medium;

a MIDI sound source module disposed in said casing and connected electrically to said processor unit, said MIDI sound source module receiving said MIDI information from said processor unit and transforming said MIDI information into a second electrical signal;

a mixer disposed in said casing and connected electrically to said microphone unit and said MIDI sound source module, said mixer mixing said first and second electrical signals and generating a third electrical signal; and a transmitter disposed in said casing and connected electrically to said mixer, said transmitter transmitting wirelessly said third electrical signal for reception and reproduction by the external speaker unit.

23. The portable device according to claim 22, wherein the storage medium is an integral part of the central processor unit.

24. The portable device according to claim 22, wherein the storage medium comprises a ROM package.

25. The portable device according to claim 22, wherein the musical accompaniment data is stored in the storage medium in digital form.

26. The portable device according to claim 25, wherein the ROM package includes an outlet plug to accept other separate ROM packages.

27. The portable device according to claim 22, wherein said processor unit further includes a tone controller.

28. The portable device according to claim 22, wherein said processor unit further includes a dual sound source controller for adjusting the rhythm speed of the musical accompaniment.

29. The portable device according to claim 22, wherein said processor unit further includes an echo generator.

30. The portable device according to claim 22, wherein said processor unit further includes a gain controller.

31. The portable device according to claim 22, wherein said processor unit further includes a noise filter.

32. The portable device according to claim 22, wherein said transmitter includes an RF modulator for converting said third electrical signal into a modulated radio frequency signal and an antenna for transmitting said radio frequency signal.

33. The portable device according to claim 22, wherein the storage medium is a ROM package having the musical accompaniments and associated title numbers stored therein in the form of digital signals; the keyboard is capable of selecting a desired song title number and for providing control signals for adjusting acoustic characteristics of the audio signal, and further comprising a microprocessor for performing predetermined control operations in accordance with a program routine stored in the microprocessor's internal memory when inputs from the keyboard are received and for selecting the musical data stored in the memory through a multiplexer and decoder, and the device further includes a display panel for displaying the functional status of the system through an LCD driver.

34. The portable device according to claim 33, wherein the processor unit further includes: a dual sound source controller for generating rhythm signals stereophonically on the basis of retrieved musical data from the ROM package latched by a D-flip flop through two melody ICs; voltage amplifiers for amplifying audio inputs from an external input terminal connected to an external microphone or from an internal microphone, a tone controller for shaping waveforms of the amplified audio input signal, an echo generator for selectively generating an echo sound of a delayed low noise output with respect to the audio input signal; a gain controller for enhancing the differential gain and differential phase of the audio input from the voltage amplifiers; and a noise filter for increasing the signal to noise ratio of the output signal of the gain controller by removing noise components contained in the output signal.

35. The portable device according to claim 34, wherein the transmitter further comprises an RF modulator for converting the audio input signal mixed with the echo sound selectively produced in the echo generator and the reproduced musical accompaniment signal from the dual sound source controller into a radio frequency signal modulated to be transmitted through an antenna.

36. The portable device according to claim 35, wherein the ROM package further comprise an outlet plug for inserting separate ROM packages.

37. The portable device according to claim 36, wherein said keyboard further comprises; numeric keys 0 to 9 for selecting a desired song title number, a rhythm speed controlling key, a musical interval controlling key, adjustment up and down keys for adjusting the rhythm speed and the tone at the desired value when the music is in play, a reset button for restoring the system to its normal or initial state when it encounters trouble in operation or mistakes in selecting a key, a continuous play key for continuously playing the accompaniment music stored in the ROM package without selection of a song title, a ROM package designation key for selecting any one of the separate ROM packages, an echo button for obtaining echo effect of the voice input from the microphone, a start or play button for the playing of the selected musical accompaniment, and a power switch for supplying the power source to the system from an internal battery.

38. The portable device according to claim 35, further comprising a frequency modulator which includes the echo generator having a bucket bridge device for generating an echo sound signal and for amplifying the echo sound signal by way of push-pull transistors, the tone controller for controlling the amplification rate of the echo sound signal by adjusting a variable resistor of the echo generator and for mixing the voice inputs from the stereophonic microphone input terminals, the gain controller having an operational amplifier, a volume adjusting variable resistor, and a filter consisting of resistors and capacitors for allowing the amplified input signal through the operational amplifier to have a proper volume level by adjusting the variable resistor and for dividing the voice input signal into stereophonic audio signals through the filter, and the RF modulator for mixing the stereophonic audio signals with the inputs of the reproduced musical accompaniment signals passed through a noise filter consisting of resistors and capacitors and for fine tuning by a radio frequency generated from the oscillator consisting of an inductor and for transmitting the modulated output signal carrying the human voice and melody accompaniment through the antenna.

39. The portable device according to claim 38, wherein said RF modulator converts the audio input signal mixed with the reproduced musical accompaniment into the radio frequency designated to one of the conventional FM channel frequencies, and the radio frequency signal is then fine tuned and transmitted through the antenna, so that it can be received by common FM receivers.

40. The portable device according to claim 35, wherein said RF modulator converts the audio input signal mixed with the reproduced musical accompaniment into the radio frequency designated to one of the conventional FM channel frequencies, and the radio frequency signal is then fine tuned and transmitted through the antenna, so that it can be received by common FM receivers.

* * * * *